Nov. 4, 1958 F. B. EASTON 2,859,047
STABILIZER ARRANGEMENT FOR PNEUMATIC SUSPENSION
Filed Feb. 14, 1957 2 Sheets-Sheet 1

INVENTOR.
FRANKLIN B. EASTON
BY
RICHEY, WATTS, EDGERTON,
McNENNY & FARRINGTON
ATTORNEYS

Nov. 4, 1958  F. B. EASTON  2,859,047
STABILIZER ARRANGEMENT FOR PNEUMATIC SUSPENSION
Filed Feb. 14, 1957  2 Sheets-Sheet 2

INVENTOR.
FRANKLIN B. EASTON
BY
RICHEY, WATTS, EDGERTON,
McNENNY & FARRINGTON
ATTORNEYS

United States Patent Office 2,859,047
Patented Nov. 4, 1958

2,859,047

STABILIZER ARRANGEMENT FOR PNEUMATIC SUSPENSION

Franklin B. Easton, Salem, Ohio, assignor to Youngstown Steel Car Corporation, Niles, Ohio, a corporation of Ohio Application February 14, 1957, Serial No. 640,099

6 Claims. (Cl. 280—124)

This invention relates broadly to pneumatic spring suspension assemblies and more specifically to improvements in the structure of the undercarriage therefor.

The objects of the invention reside in the provision of a mechanism to stabilize the flexure of the air cells, linkage to restrain lateral movement thereof, mechanism to resist tilting of the body when the vehicle makes a sharp turn, and mechanism to maintain the wheels in tracking relation.

Another object of the invention is to provide a pair of inter-connected levers of the first order fulcrumed on the undercarriage members that carry the unsprung weight and inter-linked with the members that carry the vehicle body in order to effect an equalized unidirectional movement of the air cells during the flexure thereof.

Another object of the invention is to provide a pair of levers having the inner contiguous ends thereof interconnected by a yieldable floating coupling.

Further objects of the invention reside in the provision of an air spring undercarriage which is sturdy of structure, light in weight, economic of manufacture and efficient in stabilizing the loads imposed thereon, and a mechanism to equalize unbalanced loading of the body and restrain axle torque under sudden application of the vehicular brakes.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
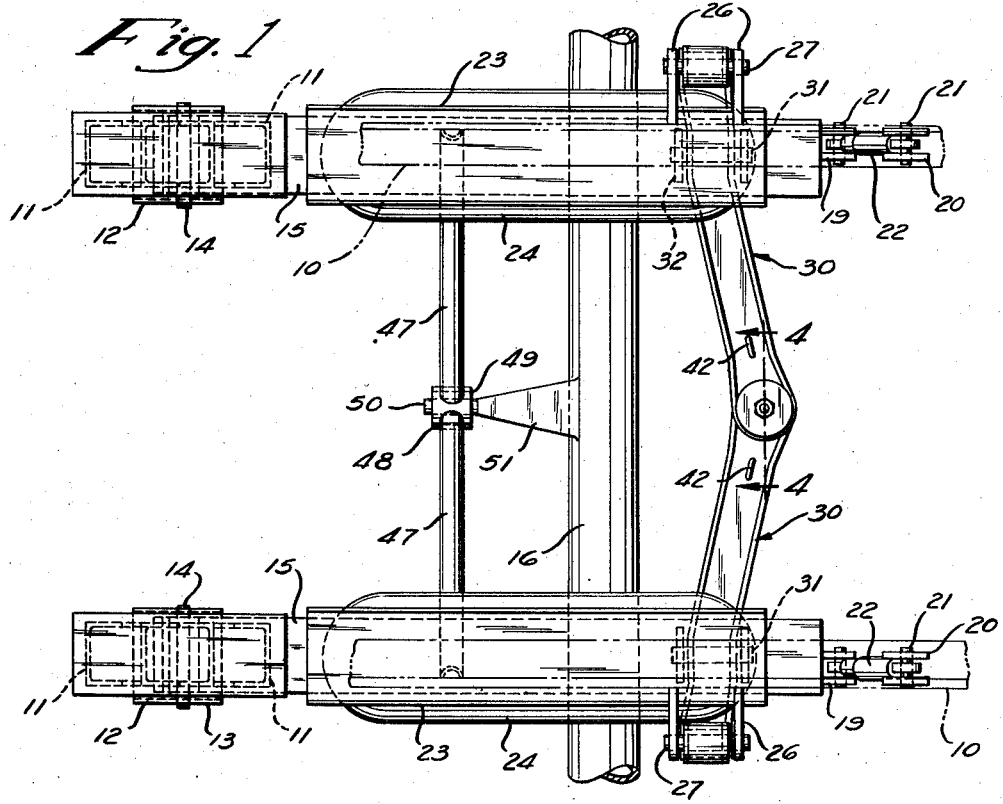
Fig. 1 is a plan view of the improved vehicular undercarriage.
Figure 2:
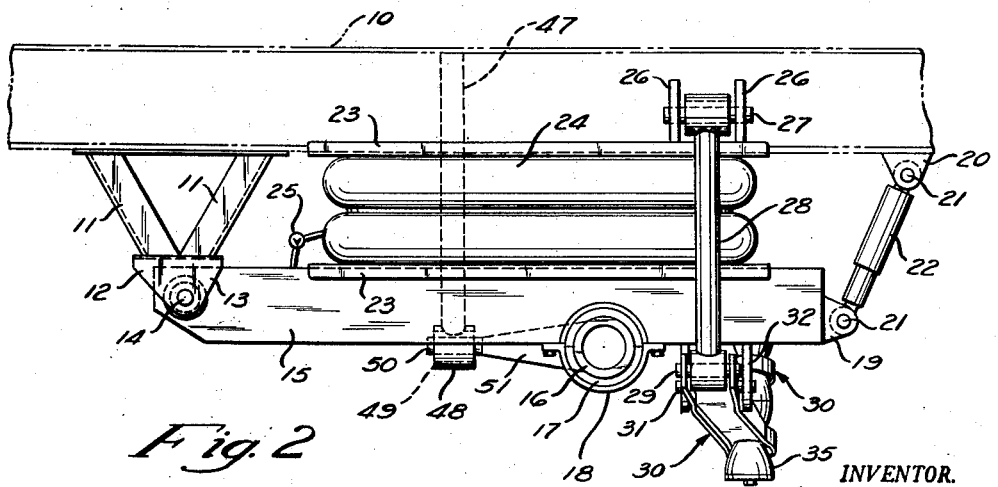
Fig. 2 is a side elevational view thereof.
Figure 3:
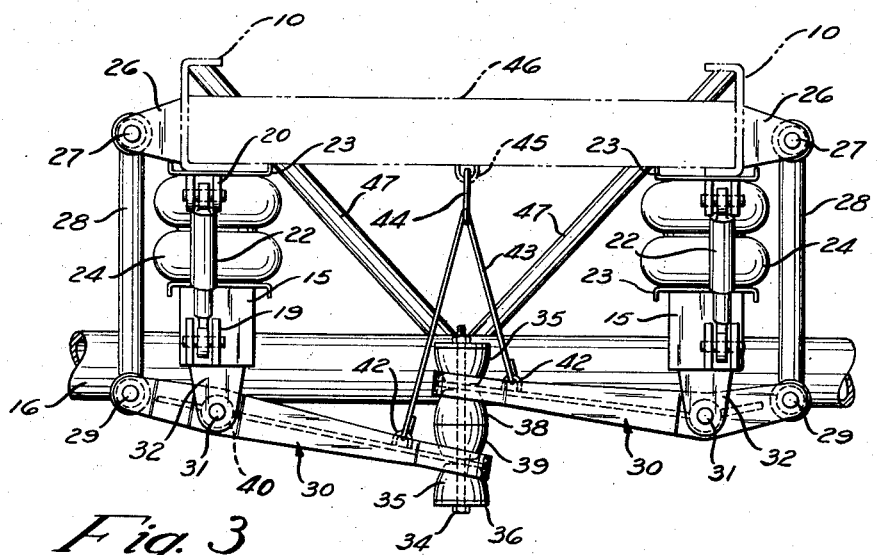
Fig. 3 is an end elevational view of the undercarriage assembly.
Figure 4:
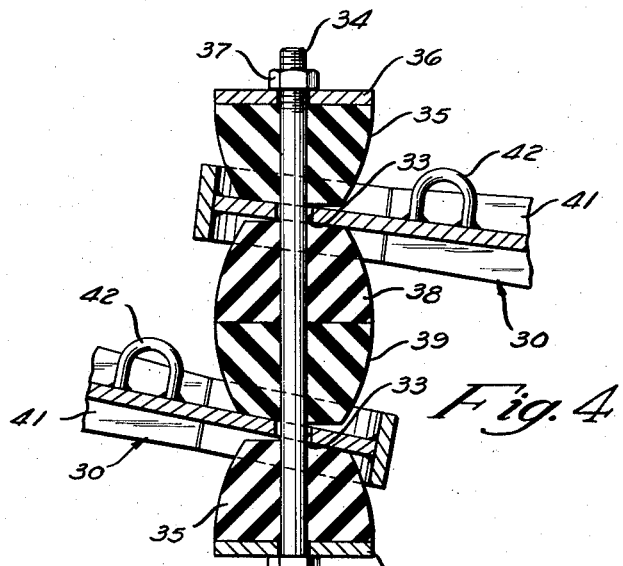
Fig. 4 is a vertical sectional view through the coupling, the section being taken on a plane indicated by the line 4—4 of Fig. 1.
Figure 5:
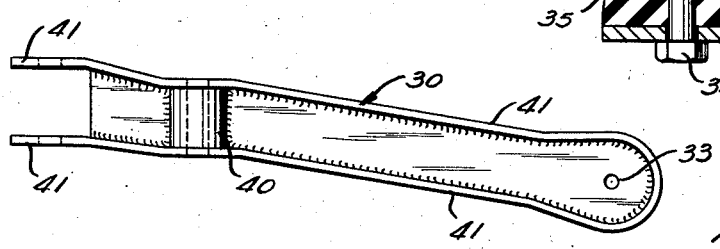
Fig. 5 is a plan view of one of the lever arms.

Referring first to Fig. 1, the undercarriage comprises a pair of longitudinal beams 10 which, as shown, may be the body sills incorporated in the truck manufacturers design, or secondary channel irons subjacent the beams, or fabricated sheet steel beams of square transverse section adapted to carry the body sills and serve as surge tanks for the air cells. The forward ends of the beams are provided with depending convergent arms 11 which carry channeled brackets 12, having openings in the subtended ears 13 thereof, to receive rubber clad bolts 14 for the pivotal support of bolster rails 15. The bolsters are constructed from sheet steel plates welded to form hollow prismoidal bodies adapted for use as surge tanks for the air cells when the beams 10 are constructed from channel irons. The bolsters have the vehicular axle 16 mounted thereon in rubber bushings 17 retained by bearing caps 18 surrounding the lower face of the axle. The rearward ends of the bolsters and lower face of the beams are provided with channeled brackets 19 and 20 respectively, having the ears thereof cross-drilled to retain bolts 21 for the pivotal support of shock absorbers 22, of conventional form. The confronting faces of the beams and bolsters are engaged with flanged plates 23 vulcanized to the rubber air cells 24 and fluid communication between the chambers therein, and the surge tanks, when the bolsters 15 are used in such a manner as illustrated in the present embodiment, is attained through valves 25. The outer side walls of the beams 10 are provided with channeled brackets 26 having openings in the ears thereof to receive bolts 27 for the pivotal support of depending links 28. The lower ends of the links are drilled to receive bolts 29 to provide pivotal connections between the links and the outer ends of levers 30. The levers are fulcrumed on bolts 31 carried by brackets 32 welded to the lower faces of the bolster rails 15. The inner ends of the levers are disposed in vertically aligned relation with each other, and the end portions thereof are drilled with clearance openings 33 for a bolt 34. The bolt has hemispherical rubber buffer blocks 35 on the end portions thereof abutting the outer faces of the levers 30, the blocks being retained in place by washers 36 and nuts 37. The bolt further carries a pair of similar buffer blocks 38 and 39 arranged in end to end relation between the inner faces of the ends of the levers. Pneumatic rubber air cells may, if desired, be substituted for the blocks 35, 38 and 39. Each of the levers 30, as illustrated in Fig. 5, is constructed from a lineal steel plate having a cylindrical bushing 40 welded intermediate its ends for the reception of the bolt 31, and a narrow band is welded about the major portion of the periphery thereof to form side flanges 41. The outer ends of the flanges 41 protrude beyond the center plate and are cross-drilled to form openings for the pins 29. Eyelets 42 are welded to the upper faces of the inner ends of the levers for the retention of a rebound cable 43 suspended intermediate its ends from a ring 44 inter-linked with an eye 45 on a body frame cross member indicated by the dot-dash lines 46 in Fig. 3. The beams 10 are provided with a pair of downwardly inclined braces 47 welded to a bored cylindrical bearing 48 in the medial axis of the vehicle. The bearing has a rubber bushing 49 therein which supports a pintle 50 mounted on a bracket 51 welded to the axle in aligned relation therewith. As the axle 16 tends to rotate in its rubber bearing 17, slight axial movement of the pintle 50 will occur, but sufficient universal movement is afforded by the rubber bushing to accommodate such angular deflection and still delimit excessive sidewise displacement of the axle.

When the right-hand road wheel (not shown) on the axle 16 strikes a protuberance in the highway and effects the compression of the superjacent air cell, the contiguous link 28 will depress the outer end of the lever 30 and effect a similar movement of the outer end of the opposed lever and link (the left lever as viewed in Fig. 3), thus equalizing the vertical movement of the body and stabilizing the flexure of the two air cells. The rubber buffer blocks 35, 38 and 39 on the bolt 34 absorb minor road shocks and restrain excessive movement of the inner ends of the levers when violent shocks are imposed thereon. The rubber clad pins in the connections between the levers 30, and the links 28, and the rubber bushings in the connections between the bolsters 15 and brackets 11 on the frame 10 provide a cushioning action and slight universal movement when the bolsters 15 swing in an arcuate path about the bolts 14 and thus relieve the strain on the pins 29. Lineal movement of the bolster rails is restrained by the arms 11 and the shock absorbers 22, both of which accommodate vertical pivotal movement. Side sway, as normally encountered when the vehicle negotiates a sharp turn, is arrested by the levers 30, links 28, braces 47 and bracket 51. The braces 47 and bracket 51 maintain tracking of the wheels on the axle 16 with the forward wheels of the vehicle and restrain axle torque upon application of the vehicular brakes.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An undercarriage for a vehicular air cell supporting structure comprising a rectangular chassis frame, brackets depending from the forward end thereof, rubber clad pins in said brackets, bolsters pivoted on said pins, shock absorbers between the rearward ends of said bolsters and said frame, rubber bushings on said bolsters, a vehicular axle mounted in said bushing, air cells intermediate said bolsters and said frame, a bracket affixed to said axle, brace rods transverse said frame, a bearing block connected to said brace rods in aligned relation with said bracket, a rubber journal bearing in said block supporting the end of said bracket, rubber clad pins supported on the lower face of said bolsters, transversely aligned levers pivoted intermediate their ends on said pins, a yieldable connection between the inner ends of said levers, rubber clad pins carried by said chassis frame and the outer ends of said levers and links pivotally mounted on said pins.

2. An undercarriage for a vehicular air cell supporting structure comprising a rectangular chassis frame, rubber clad pins thereon, bolsters pivoted on said pins, air cells intermediate said bolsters and said frame, shock absorbers between the rearward ends of said bolsters and said frame, rubber bushings on said bolsters, a vehicular axle mounted in said bushing, an arm affixed to the center of said axle, a brace transverse said frame, a bearing connected to the center of said brace, a rubber sleeve in said bearing supporting the end of said arm, rubber clad pins supported on the lower face of said bolsters, aligned levers pivoted intermediate their ends on said pins, a yieldable connection between the inner ends of said levers, pins carried by said chassis frame and the outer ends of said levers and links pivotally mounted on said pins.

3. An undercarriage for a vehicular air cell supporting structure comprising a rectangular chassis frame, arms depending from the forward end thereof, brackets on the ends of said arms, rubber clad pins in said brackets, bolsters pivoted on said pins, air cells between said bolsters and said frame, shock absorbers between the rearward ends of said bolsters and said frame, rubber bushings supported on said bolsters, a vehicular axle mounted in said bushing, an arm affixed to said axle, brace rods transverse said frame, a bearing connected to said brace rods in aligned relation with said arm, a rubber sleeve in said bearing supporting the end of said arm, brackets on the lower face of said bolsters, rubber clad pins supported therein, aligned levers pivoted intermediate their ends on said pins, a rod connecting the inner ends of said levers, rubber blocks on said pins between the ends of said levers, brackets carried by said chassis frame, rubber clad pins in said brackets in the outer ends of said levers, and links pivotally mounted on said pins.

4. An undercarriage for a vehicular air cell supporting structure comprising a rectangular chassis frame, arms depending from the forward ends thereof, brackets on said arms, rubber clad pins in said brackets, bolsters pivoted on said pins, shock absorbers intermediate the rearward ends of said bolsters and said frame, rubber bushings seated in said bolsters, a vehicular axle mounted in said bushing, air cells intermediate said bolsters and said frame, an arm on the center of said axle, a depending brace on said frame forward said axle, a bearing block connected to the center of said brace, a rubber journal bearing in said block supporting the end of said arm, rubber clad pins supported on the lower faces of said bolsters, levers pivoted intermediate their ends on said pins, a bolt loosely uniting the inner ends of said levers, rubber blocks in said bolt abutting the confronting faces of said levers, rubber clad pins mounted on said chassis frame and in the outer ends of said levers and links pivoted on said pins.

5. An undercarriage for a vehicular air cushion support comprising a chassis frame, brackets depending therefrom, bolsters pivoted at their forward ends to said brackets, air cells between said bolsters and said frame, levers transverse said frame pivoted adjacent their outer ends to said bolsters, a bolt loosely uniting the inner ends of said levers, yieldable blocks on said bolt for universal movement of said levers, links pivotally connected to said frame and to the outer ends of said levers, an axle yieldably mounted on said bolsters, a horizontal bracket on said axle, and a cross brace on said frame yieldably connected to said horizontal bracket for restraining lateral movement thereof.

6. An undercarriage for a vehicular air cushion support comprising a chassis frame embodying parallel side rails, brackets depending therefrom, bolsters pivoted at their forward ends to said brackets, air cells between said bolsters and said frame, levers transverse said frame pivoted adjacent their outer ends to said bolsters, a bolt through the inner ends of said levers, a rubber block on said bolt between said levers and second rubber blocks between the ends of said bolt and said levers for universal movement thereof, links pivotally connected to said frame side rails and to the outer ends of said levers, an axle yieldably mounted on said bolsters, a horizontal bracket on said axle, a cross brace between said frame side rails yieldably connected to said horizontal bracket, snubbers between the rearward ends of said bolsters and said frame side rails, and means on the inner ends of said levers to delimit the vertical movement thereof.

References Cited in the file of this patent
UNITED STATES PATENTS

| | | |
|---|---|---|
| 1,838,591 | Swanson | Dec. 29, 1931 |
| 2,442,252 | Utz | May 25, 1948 |
| 2,713,498 | Brown | July 19, 1955 |